United States Patent [19]
Rapp

[11] Patent Number: 5,223,880
[45] Date of Patent: Jun. 29, 1993

[54] ACCESSORY DEVICE FOR CAMERAS

[76] Inventor: Eugen Rapp, Tilsiter Stra E12, 2805 Stuhr 2, Fed. Rep. of Germany

[21] Appl. No.: 663,830
[22] PCT Filed: Jul. 27, 1990
[86] PCT No.: PCT/EP90/01228
§ 371 Date: Mar. 19, 1991
§ 102(e) Date: Mar. 19, 1991
[87] PCT Pub. No.: WO91/02284
PCT Pub. Date: Feb. 21, 1991

[30] Foreign Application Priority Data
Aug. 3, 1989 [DE] Fed. Rep. of Germany ....... 3925666

[51] Int. Cl.$^5$ .............................................. G03B 11/00
[52] U.S. Cl. .................................................. 354/295
[58] Field of Search ................................ 354/295, 64

[56] References Cited
FOREIGN PATENT DOCUMENTS
2901982 7/1980 Fed. Rep. of Germany .

Primary Examiner—Michael L. Gellner
Assistant Examiner—Howard B. Blankenship
Attorney, Agent, or Firm—Merchant, Gould, Smith, Edell, Welter & Schmidt

[57] ABSTRACT

An accessory device for cameras having a housing, a cylindrical opening whose diameter corresponds to at least the diameter of a camera objective, a rotatably-journaled, transparent protective element for closing off the housing, and an electric motor for rotating the protective element. The electric motor comprises a casing surrounding the protective element to form a rotor of the electric motor. The stator windings of the electric motor are attached to the housing.

11 Claims, 6 Drawing Sheets

ACCESSORY DEVICE FOR CAMERAS

FIELD OF THE INVENTION

The invention concerns an accessory device for cameras, in particular for professional photo cameras, film cameras or video cameras.

BACKGROUND OF THE INVENTION

Professional cameras, such as for example photo cameras, film cameras or video cameras, are employed out in the open under the most varied of weather conditions. Resulting here is the problem that raindrops, snow, dust particles, etc., precipitate on the outer lens of the objective. Arising from this are lack of definition and distortions when taking pictures, the quality of the photo, as a whole, being impaired and the user is continually busy keeping the precipitates from the lens and/or cleaning the lens.

SUMMARY OF THE INVENTION

Therefore, the object of the invention is to provide an accessory device for cameras, which assures that the outer surface of the lens systems or of a transparent accessory element remains clean and drop-free.

This object is satisfied in accordance with the invention, in the case of an accessory device of the initially-mentioned type, by a housing, a cylindrical housing-opening whose diameter corresponds at least to the diameter of the objective, a rotatably journaled, transparent protective element closing off the housing opening, a drive for driving the protective element in a rotary movement, and an attaching element for attaching the device to the camera in a position in which the housing opening aligns with the objective.

The advantages of the invention in particular lie in the fact that the transparent protective element, which is situated in front of the lens system of the objective, is rotatably journaled and can be displaced in a rapid rotary movement by means of a drive, which flings away toward the outside liquid or solid precipitates on the protective element, because of the acting centrifugal forces. In this way, the surface of the protective element is continually free of drops, streaks or snow, and/or dirt particles. Since, besides this, the housing with a cylindrical wall reaches as far as the objective of the camera, the lens system is protected against moisture and dirt by this housing wall. When using the accessory device in accordance with the invention, it is therefore possible, even in the case of strong precipitation or driven snow, etc., to make sharp pictures.

Advantageously, the protective element is held in the inner ring of a ball race by means of a casing. The outer ring of the ball race is preferably attached in the cylindrical wall surrounding the housing opening. On the camera side, the cylindrical wall of the housing aligns with the casing of the objective, with a ring preferably made of elastic material producing the connection between housing and objective, and overlapping and/or underlapping the outer rim of the objective in non-contacting fashion. The non-contacting attachment of the accessory device to the objective has the particular advantage that shocks and vibrations are not transferred to the objective. Conversely, the objective can, be automatically turned by hand, and this rotary movement can — unhindered by the accessory device — be carried out without restrictions. Instead of the non-contacting transition from the objective to the housing of the accessory device, it is also alternatively possible to use a ring made of elastic material between housing and objective that is releasably attachable to the objective and journaled in rotatable and axially-displaceable fashion on the housing, in order to enable the turning movements when making adjustments to the objective. With this form of embodiment of the invention, preferably provided in the elastic ring and/or in the housing section adjoining thereto is a number of ventilating openings, in order to enable an exchange of air with changes in outside temperature.

In another form of embodiment of the invention, the ring adjoining the housing on the camera side is releasably attached to the objective and projects, in a contacting and/or non-contacting fashion over a prescribed length, over and/or under the housing in order to permit the rotary movement of the objective and, thereby, simultaneously to close off the space between the objective and the rotatable protective element against penetration of rain, snow or dirt particles.

The drive contains a motor which, in one form of embodiment of the invention, drives the protective element via at least one transmission element, e.g. a transmission belt. Further provided is a control circuit with which the drive can be activated periodically, once in a while, during short intervals, or permanently.

According to an alternative form of embodiment of the invention, the casing for the protective element is constructed as the rotor of an electric motor. The stator winding of the electric motor is then attached to the housing, round about the casing for the protective element. This form of embodiment has the advantage that the electric motor is integrated into the accessory device in space-saving fashion, such that a separate electric motor parallel to the axis of the objective can be eliminated. The protective element can be constructed as a flat glass disk, as a lens or as a filter. If desired, it is possible to also provide a spraying apparatus by means of which the spraying liquid can be sprayed on the rotating protective element in order to loosen dirt particles or the like.

Advantageous further developments of the invention are characterized by the features of the subclaims. Explained in more detail in the following with the aid of the drawing are examples of embodiment of the invention.

DETAILED DESCRIPTION OF THE PREFERRED EMBODIMENT

Figure 1:
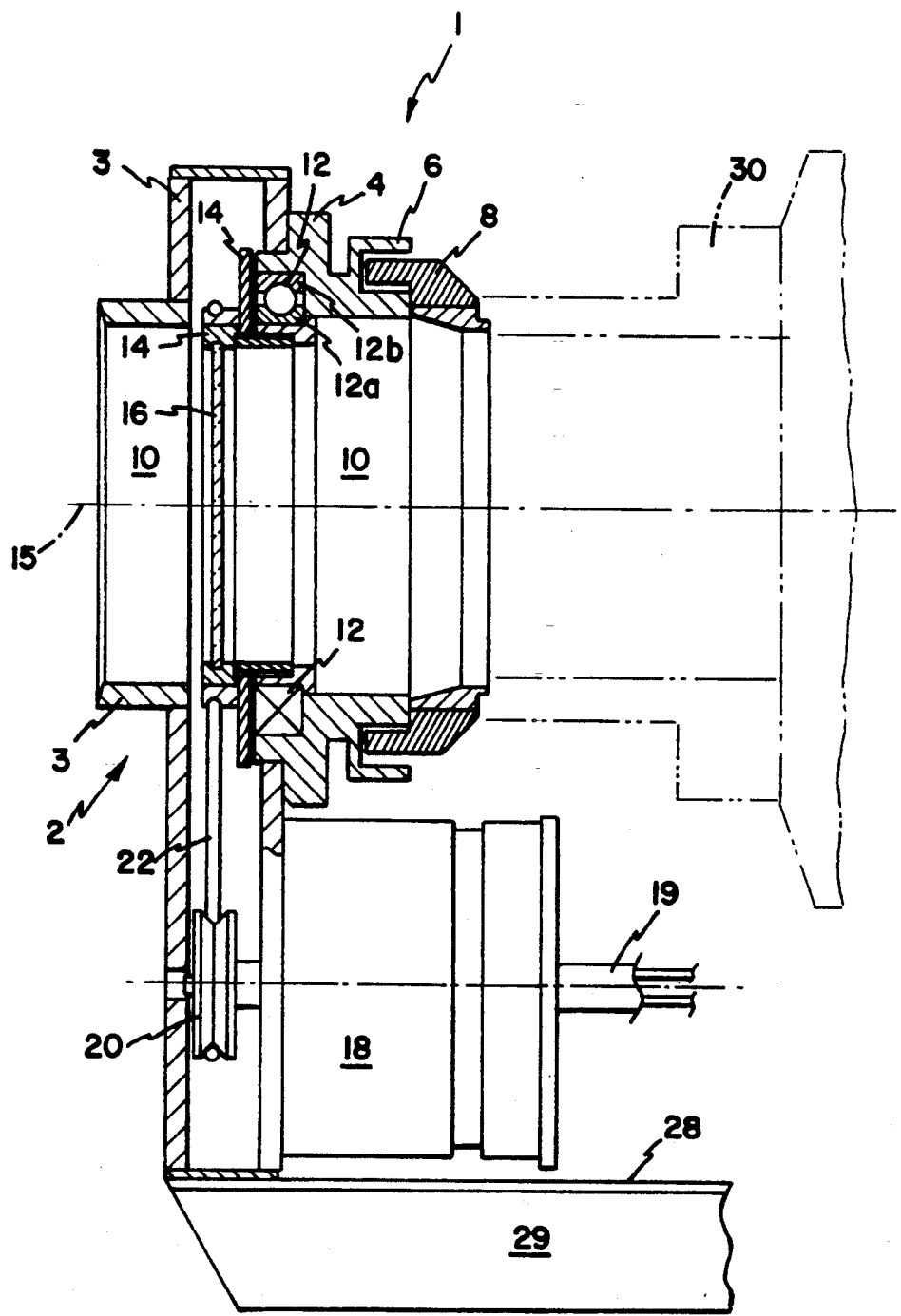
FIG. 1 shows a cross section through a first form of embodiment of the accessory device.
Figure 2:
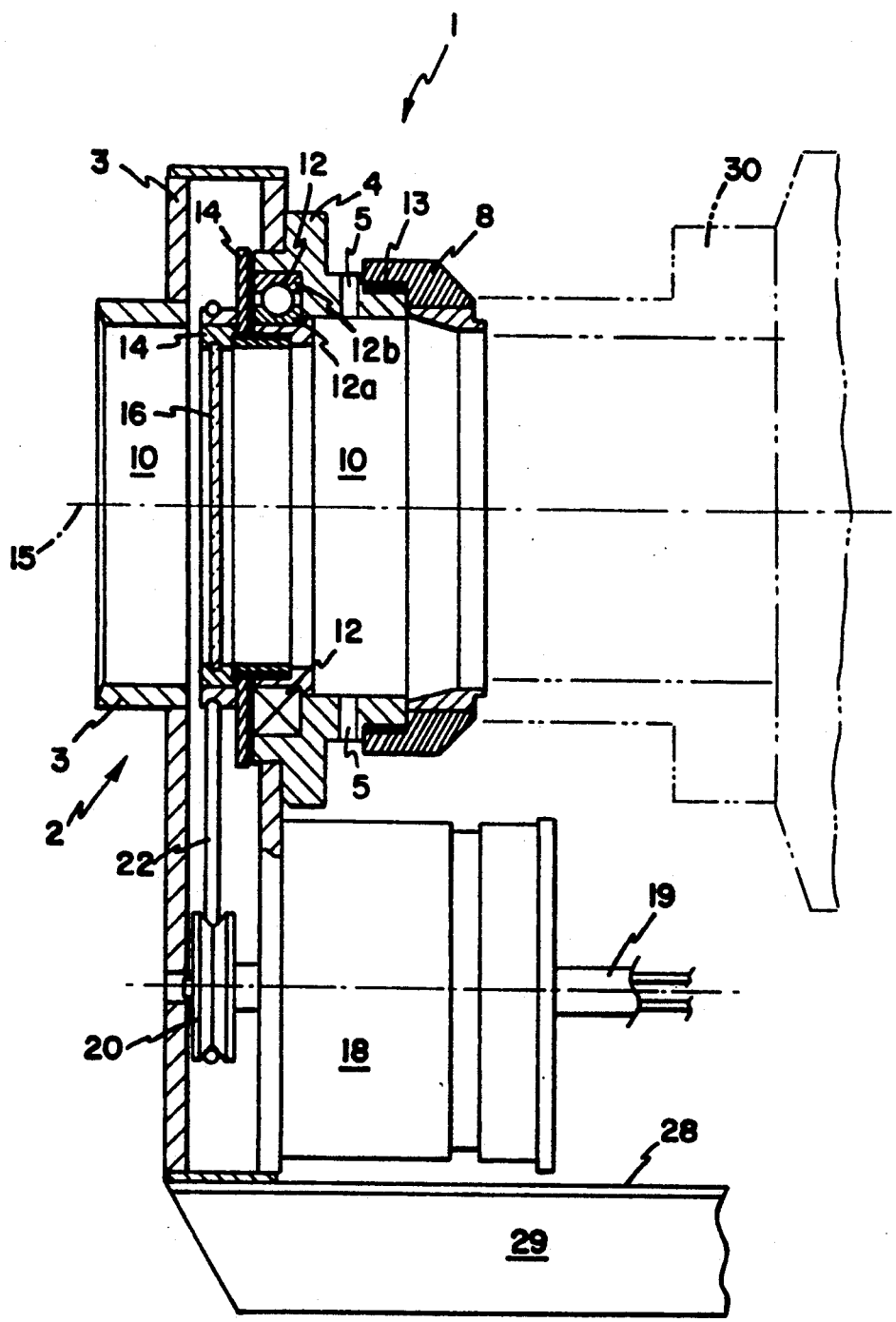
FIG. 2 shows a cross section through a second form of embodiment of the accessory device.
Figure 3:
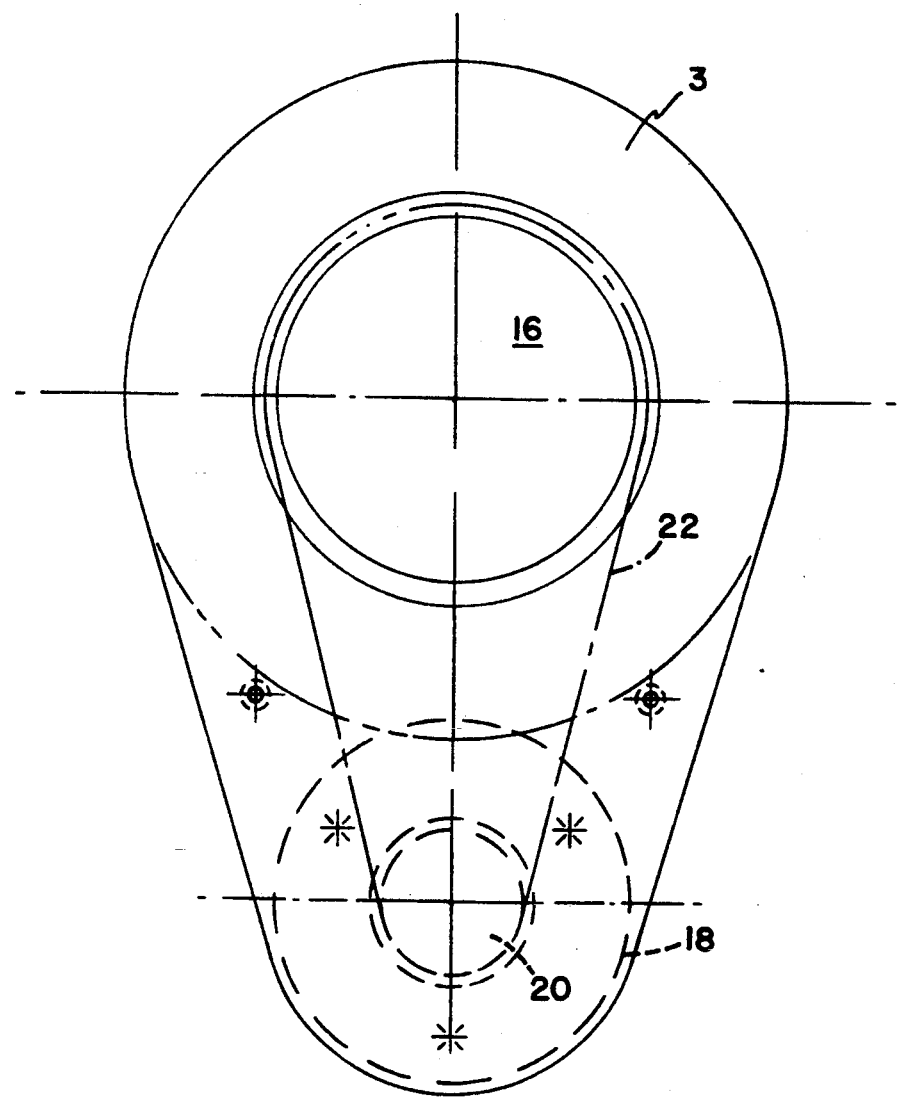
FIG. 3 shows a front view of the accessory device in accordance with FIG. 1 or 2.

FIG. 1 to 3 show a cross section and a front view of two forms of embodiment of the accessory device, differing only slightly from one another. The accessory device 1 has a housing 2, through which extends a cylindrical housing-opening 10 whose diameter corresponds approximately to the diameter of the objective 30. In the form of embodiment represented, the housing 2 is comprised of a front-side housing section 3, a middle housing section 4 adjoining thereto, and a camera-side housing section 6, which are firmly joined with one another, respectively pass over into one another in one piece. Provided between the camera-side housing section 6 and the outer rim of the objective 30 is a ring 8 that is releasably attachable to the objective 30 and that overlaps or grips under the camera-side housing section 6 in non-contacting fashion and with sufficient axial play. In this manner, the housing is coupled to the objective through the ring 8 such that manual or automatic adjustment of the objective is in no way influenced by the accessory device, on the other hand, however, such that the space provided by the housing opening in front of the lens system of the objective is reliably shielded against lateral entry of rain, snow, dirt particles, etc.

The front-side housing section has an adjoint piece 3a on which is attached an electric motor 18 whose shaft 19 runs parallel to the objective axis 15, and carries a driving pulley 20 that is encased by the front-side housing section 3.

Disposed in the housing opening 10, transversely over the entire housing opening, is a transparent protective element 16, e.g. a flat or convex lens, disk or filter, and accommodated by a circular casing 14. The casing 14 is situated in the inner ring 12a of a ball race 12 that is admitted into the inner wall of the middle housing section 4. The transparent protective element 16 is rotatably journal by means of the ball bearing 12 and closes the housing opening 10 so that precipitates, snow, dust particles can enter through the housing opening 10 only up to the transparent protective element 16.

The electric motor 18 and the drive pulley 20 represent parts of a drive that also contains yet another transmission belt 22 that runs over the drive pulley 20 and the casing 14 for the protective element 16, and when activating the motor 18 sets the protective element 16 into a fast rotating movement. By this means, raindrops, snow or dust particles that might possibly precipitate onto the surface of the protective element 16 are centrifugally cast off, so that the protective element, when activating the drive 18, 20, 22, continuously has a clean, moisture- and dust-free surface. Therefore, the camera equipped with the accessory device can, be used during persistent rain or snow without impairing the picture quality.

The accessory device 1 is attached to the camera housing with an attaching element 28 such that the housing opening 10 aligns with the objective 30. Here, the axial distance from the objective 30 is to be measured such that there is space for the axial travel of the objective when adjusting the objective, without thereby the objective running up against the accessory device.

FIG. 2 shows a form of embodiment of the accessory device that corresponds to a great extent to the form of embodiment in accordance with FIG. 1, whereby, however, the ring 8, which in this form of embodiment is rotatably journaled to the camera-side housing section 6, consists of elastic material, as for example soft elastic rubber, and grips under or overlaps in non-contacting or contacting fashion the outer rim of the objective 30. The soft elastic material of the ring 8 must be constituted such that the axial stroke of the objective 30 can be taken up by elastic deformation without noticeable exertion of force on the objective. As further indicated in this form of embodiment, the attaching element 28 can include a hollow space 29 that accommodates batteries for powering the electric motor and the electrical control circuit for the drive, as well as actuating elements for the drive.

Figure 4:
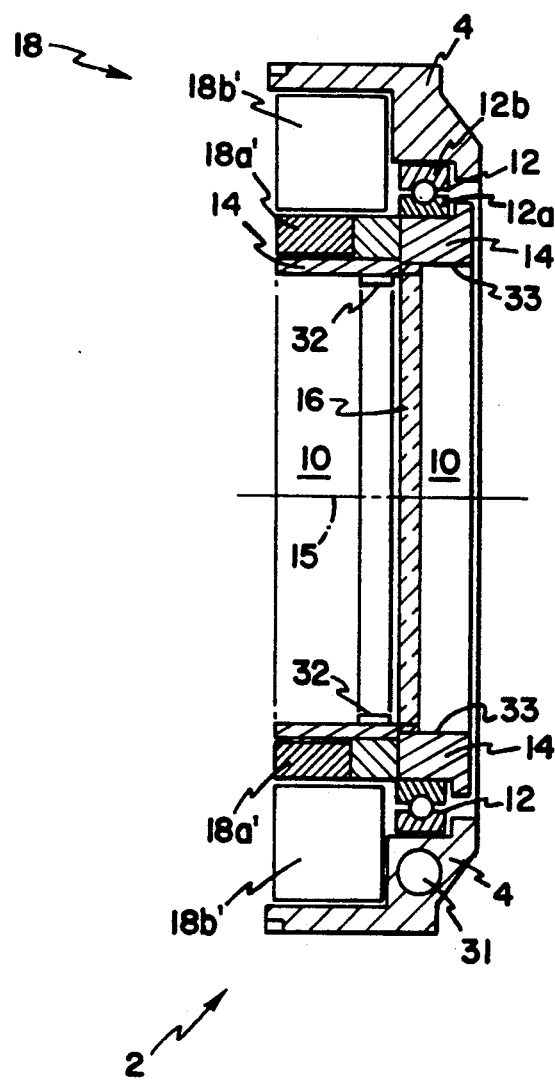
FIG. 4 shows a cross section of the preferred accessory device without a camera.

FIG. 4 shows a cross section through the middle housing section 4 of another form of embodiment of the invention. In this form of embodiment of the invention also, the protective element 16 is mounted in a circular casing 14 and extends over the entire housing opening 10. The casing 14 is situated in the inner ring 12a of a ball race 12 whose outer ring 12b is attached to the inner wall of the center housing section 4. The casing 14 (sic) of the protective element 16 is constructed at its external circumference as a rotor 18a' of an electric motor 18', whose stator 18b' is attached at the inner circumference of the center housing section 4. In this form of embodiment, the electric motor is therewith integrated into the tubular housing 2, the rotor 18a' is constructed ring-shaped about the protective element 16, the stator is likewise disposed ring-shaped firmly on the housing, closely adjacent to the rotor 18a'. A battery 31 may be disposed in the housing 2, 4 or 6, or in the attaching element 28.

A heating apparatus 32 can be provided between the protective element 16 and the lens system of the objective 30 which, e.g., is likewise battery powered and prevents, in the case of low temperatures, ice formation in this intermediate space and/or on the protective element or the front side of the lens system.

Provided on the front side, at the casing 14 of the protective element 16, is a filter thread 33 (not represented, which also allows the user to place accessory filters for the respective camera and/or the respective objective immediately in front of the rotating protective element 16, so that the accessory filter likewise concomitantly executes the rotating movement of the protective element 16.

Figure 5:
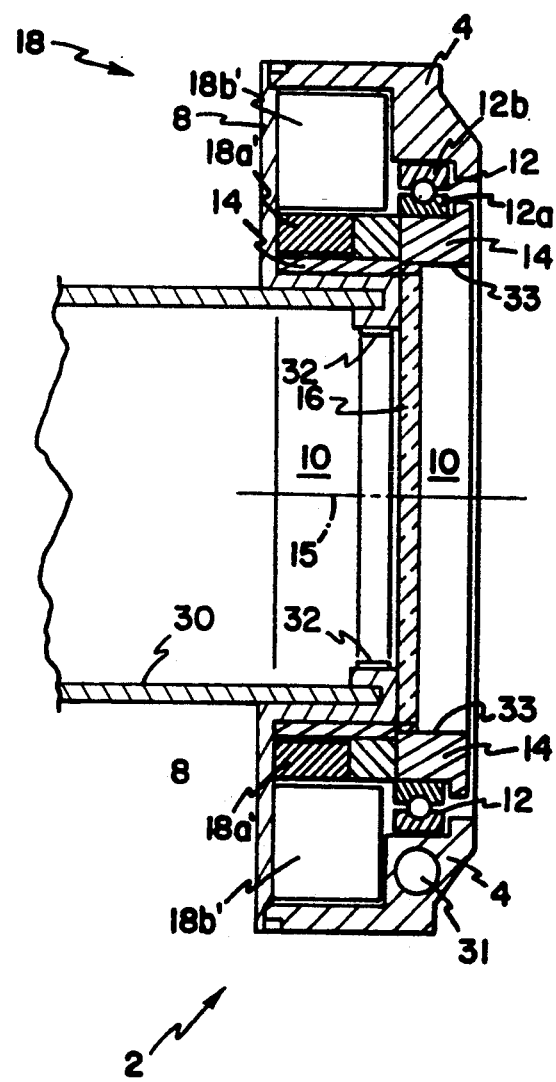
FIG. 5 shows the accessory device of FIG. 4 attached to the objective of the camera.
Figure 6:
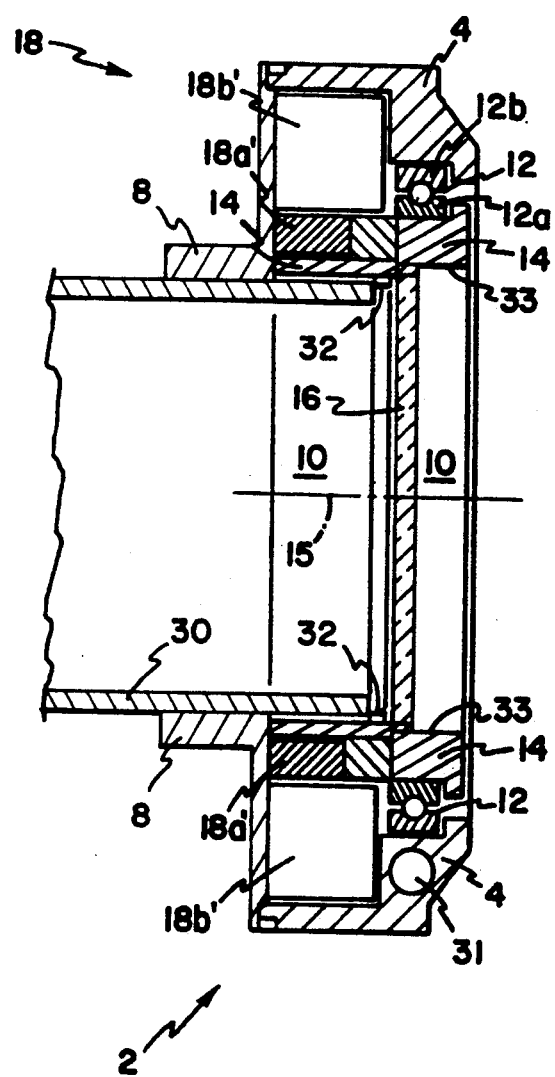
FIG. 6 shows the accessory device of FIG. 4 attached to the objective of the camera in an alternate fashion.

FIGS. 5 and 6 show the accessory device according to FIG. 4 attached to the objective 30 of the camera by ring 8, which seals the housing 2 of the accessory device at the sides of the camera. The ring 8 of FIG. 5 has a leg portion that protrudes into the housing opening 10 at a preassigned length from the side of the camera for attaching the accessory device to the free end of the camera objective 30. Alternatively, FIG. 6 shows a cross section of the accessory device according to FIG. 4, wherein the ring 8 has a radial flange to cover the housing 2 for attaching the outer surface of the objective 30 of the camera.

I claim:

1. An accessory for cameras, with a housing (2), a cylindrical housing opening (10) whose diameter corresponds at least to the diameter of the objective (30), a rotatably-journaled, transparent protective element (16) closing off the housing opening (10), a drive displaying an electric motor (18) for driving the protective element (16) in a rotary movement, with an attaching element for attaching the device (1) to the camera in a position in which the housing opening (10) aligns with the objective (30), and with a casing (14) at the rim of the protective element (16), said casing (14) of the protective element (16) forming the rotor (18a') of the electric motor (18), and the stator winding (18b') of the electric motor (18) is attached, at the housing (2,4), around the casing (14) of the protective element (16).

2. The accessory device according to claim 1, characterized by the fact that the protective element (16) is held, by means of said casing (14), in the inner ring (12a) of a ball race (12) whose outer ring (12b) is attached in the wall (4) of the housing (2) carrying the stator windings (18b').

3. Accessory device according to claim 1 characterized by the fact that the housing (2, 4, 6) overlaps or underlaps the outer rim of the objective (30) on the camera side with a ring (8).

4. Accessory device according to claim 3, characterized by the fact that the ring (8) consists of elastic material and that it is releasably attachable to the objective (30).

5. Accessory device according to claim 4, characterized by the fact that the electric motor (18) of the drive (17) is powered by batteries.

6. Accessory device according to claim 5 characterized by the fact that the batteries are disposed in the housing (2, 4, 6) or in the attaching element.

7. Accessory device according to claim 6, characterized by the fact that the protective element (16) is a flat glass disk.

8. Accessory device according to claim 1, characterized by the fact that the protective element (16) is constructed as a lens.

9. Accessory device according to claim 8 characterized by the fact that the protective element (16) is constructed as a filter.

10. The accessory device according to claim 9, characterized by the fact that a heating means (32) is disposed in the intermediate space between the protective element (16) and the lens systems of the objective (30) for heating the protective element (16) and the objective (30).

11. Accessory device according to claim 10, the casing (14) having a front side facing away from the objective (30), characterized by the fact that provided on the front side of the casing (14) of the protective element (16) is a filter thread (33) that corresponds to that of the objective (30).

* * * * *

UNITED STATES PATENT AND TRADEMARK OFFICE
CERTIFICATE OF CORRECTION

PATENT NO. : 5,223,880
DATED : 29 June 1993
INVENTOR(S) : Rapp

It is certified that error appears in the above-identified patent and that said Letters Patent is hereby corrected as shown below:

On title page, item [76] delete "Stra E12" and insert --Strasse 12--.

Signed and Sealed this

Twenty-fourth Day of May, 1994

Attest:

BRUCE LEHMAN

*Attesting Officer*      *Commissioner of Patents and Trademarks*